United States Patent Office 3,506,079
Patented Apr. 14, 1970

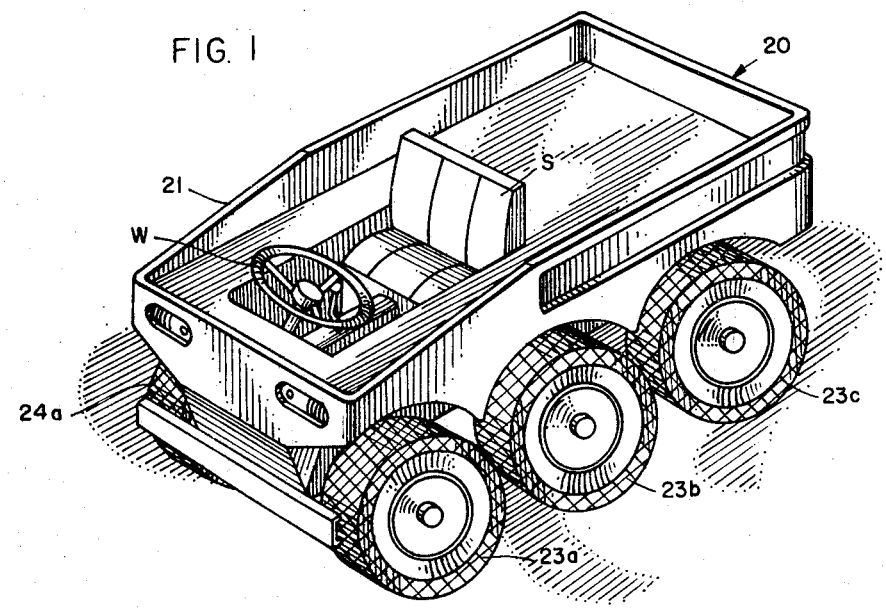
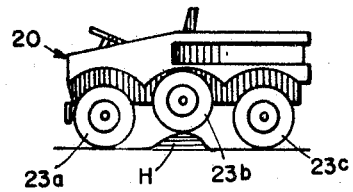
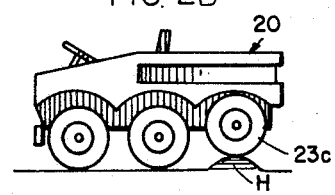
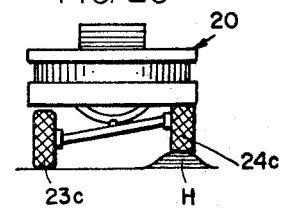
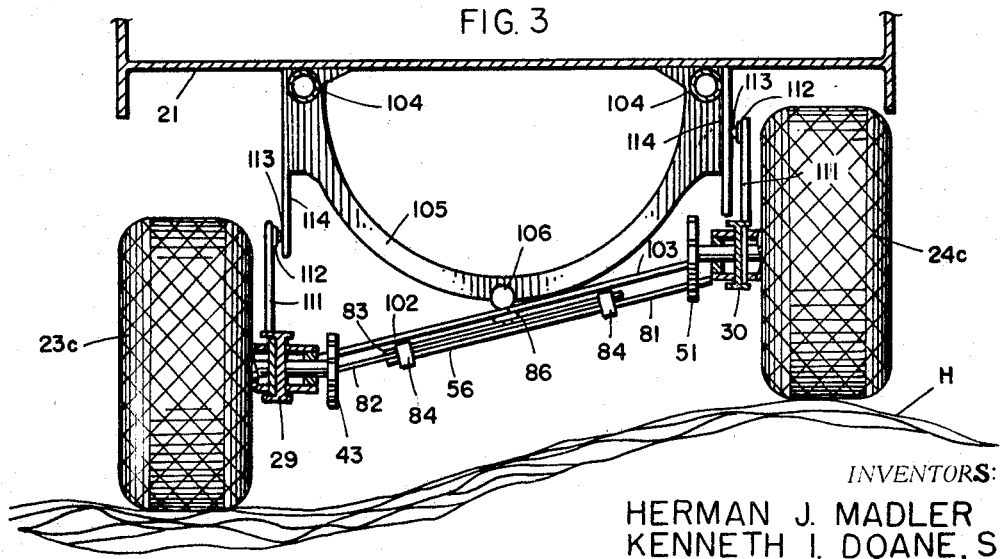

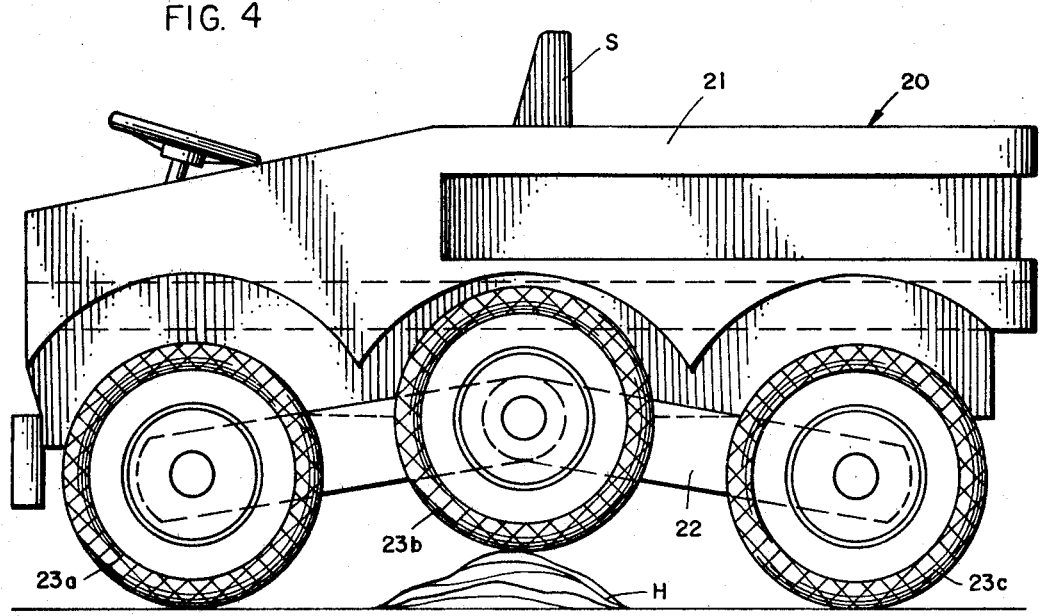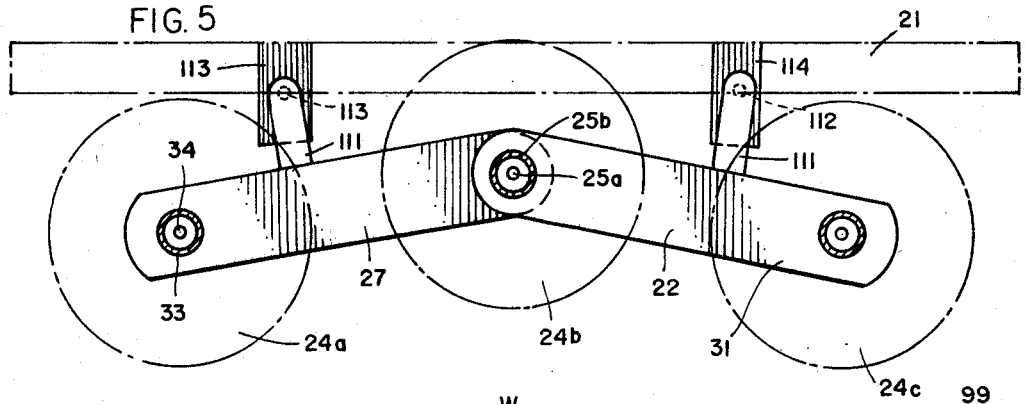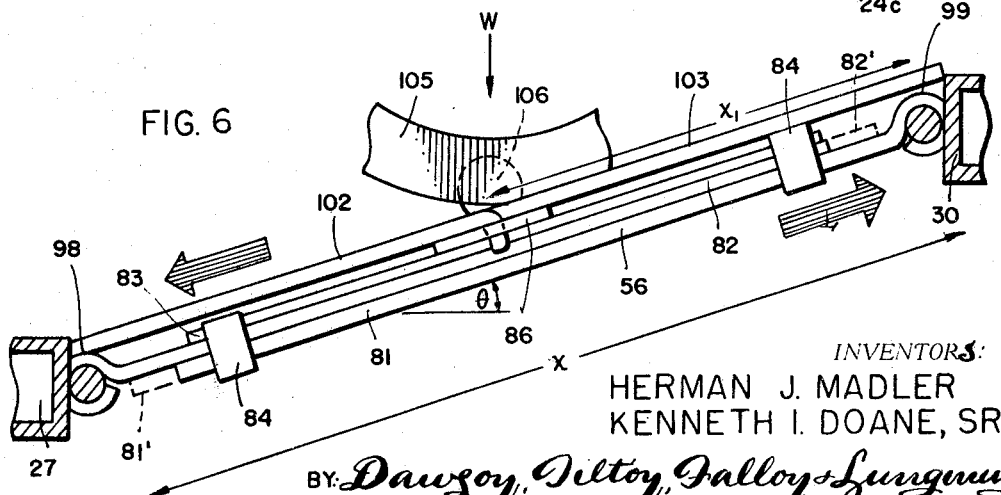

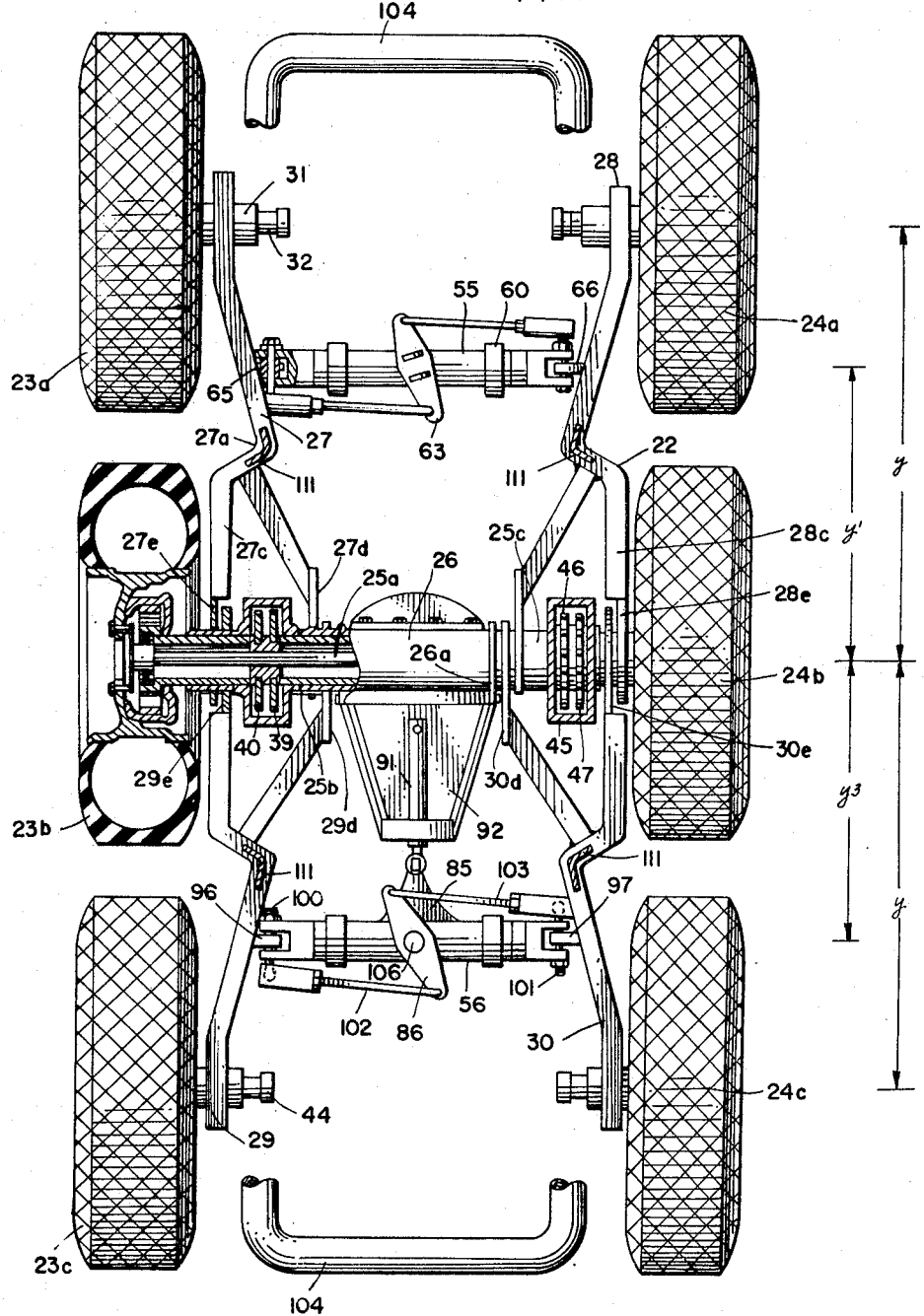

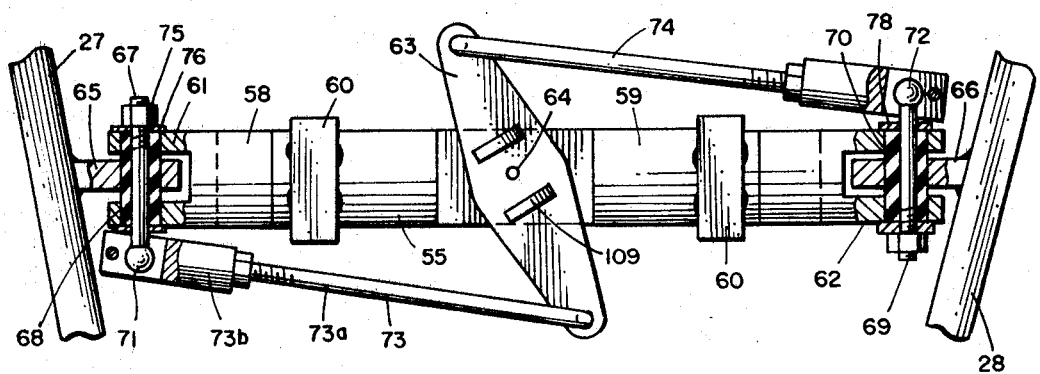
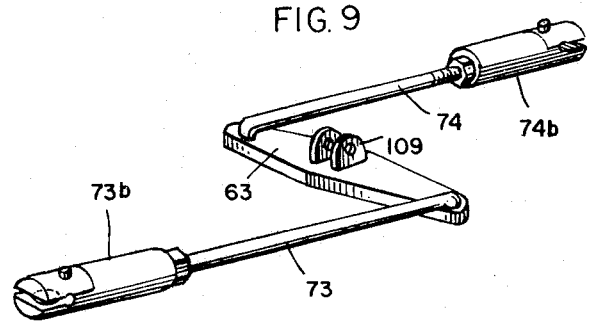
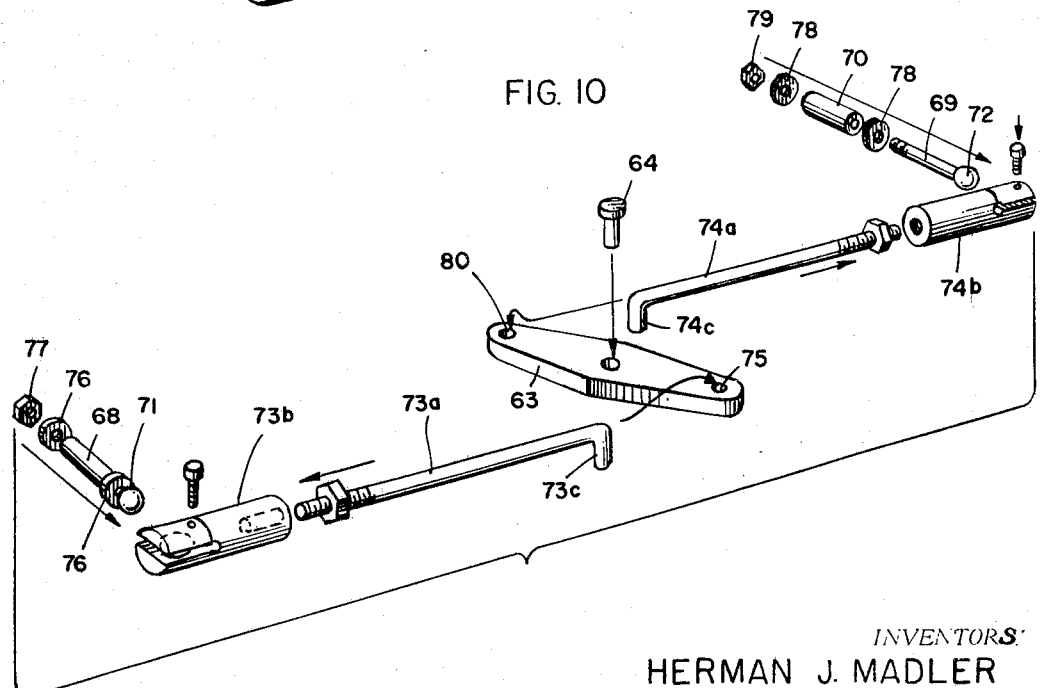

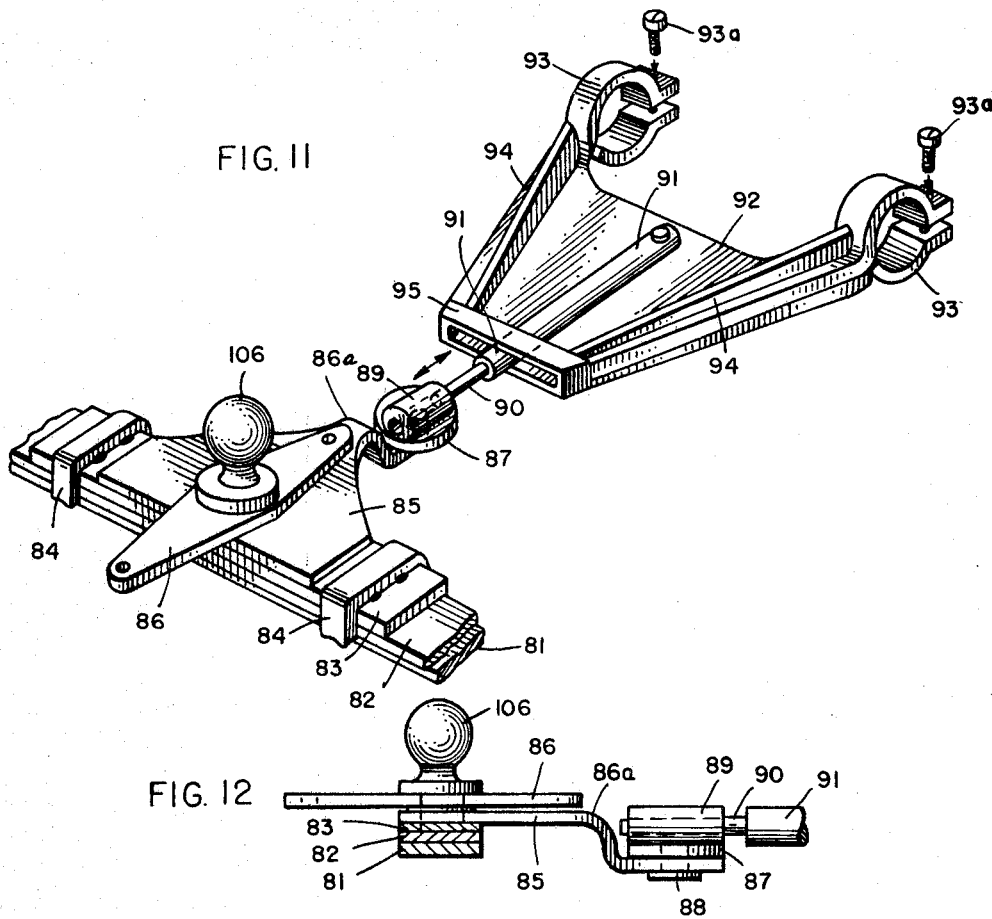
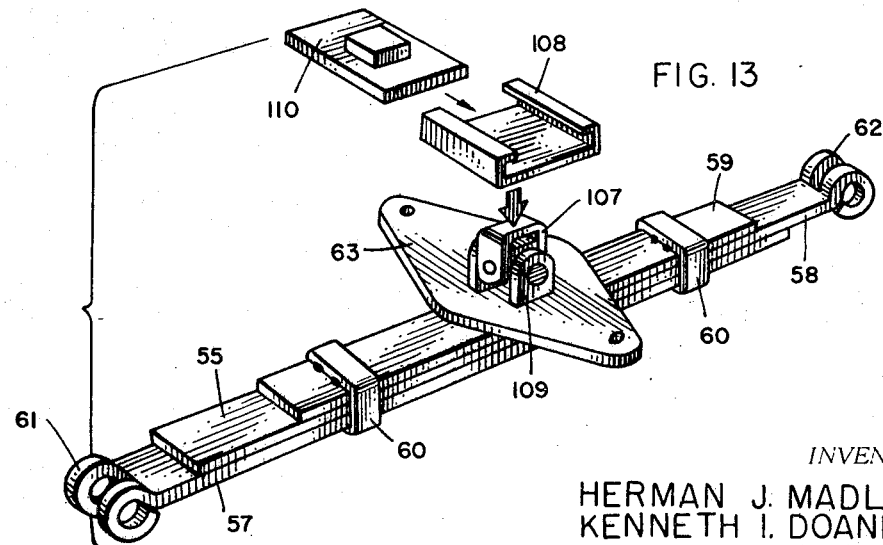

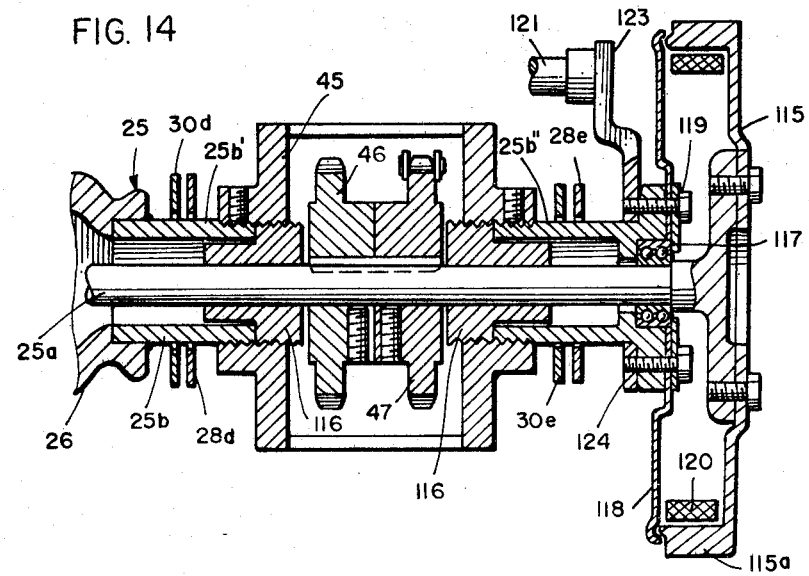

3,506,079
SIX-WHEELED VEHICLE WITH INDEPENDENT WHEEL SUSPENSION
Herman J. Madler, 2938 S. Cicero Ave., and Kenneth I. Doane, Sr., 2812 S. Cicero Ave., both of Cicero, Ill. 60650
Filed Oct. 10, 1968, Ser. No. 766,511
Int. Cl. B62k 61/10
U.S. Cl. 180—22                    12 Claims

ABSTRACT OF THE DISCLOSURE

A six-wheeled vehicle is provided with a unitary body and a split frame which permits each of the six wheels to be raised or lowered independently without transmitting torsional stress to the other wheels or to the body. The frame includes a central wheel-equipped axle and a pair of forwardly and rearwardly extending frame arms, each of which are rotatably connected to the central axle. A pair of front wheels and a pair of rear wheels are carried, respectively, by the forwardly extending frame arms and the rearwardly extending frame arms. Front and rear transverse extendible connecting arms join each pair of forwardly and rearwardly extending frame arms at approximately ⅔ the distance between the central axle and the wheels carried by the arms. Each of the connecting arms includes a pair of bars which are joined for relative sliding movement therebetween, and one end of each of the bars is joined to one of the frame arms. A third bar is also joined to the first two bars for relative sliding movement, and the third bar is maintained centered between the frame arms as the first two bars slide relative to each other by centering connecting arms. A universal joint connects the third bars of each of the connecting arms to the body, and a vertical body post on each frame arm prevents tilting of the body about its longitudinal axis.

BACKGROUND

This invention relates to a six-wheeled vehicle, and, more particularly, to a vehicle particularly adapted to traverse uneven or rough terrain.

Many vehicles have been designed to operate off improved roadways or highways and on uneven or rough terrain. Some of the vehicles are of a four wheel construction and others are of a six or more wheeled construction. In the six-wheeled vehicle category, two basic vehicle designs have evolved. One is the one piece frame, single body type vehicle. The other is the split frame, split body type vehicle. Each type has inherent limitations which prevent it from providing good transportation over uneven or rough terrain.

The one piece frame, single body type vehicle has limited rough terrain utility because of the torsional stress which is transmitted between the frame and the attached body when the vehicle is operated over rough terrain. The limitations of the vehicle are especially noticeable when two or more pairs of wheels rest on uneven ground areas, and the torsional stress transmited by the wheels to the vehicle frame is further transmitted to the body in a manner that tends to strain and damage the vehicle body.

In addition, the torsional stress reduces the amount of traction between a wheel or wheels of the vehicle and the ground by a twisting action which tends to lift a wheel partially or entirely off the ground, or, in the alternative, which prevents the wheel from dropping into full contact with the ground. These factors build into the vehicle a great amount of vibration, which, in turn causes physical fatigue to the driver and passenger and potential damage to the cargo. Furthermore, the weight of the load being transported is not being equally carried by each wheel, resulting in additional body stress. To overcome some of the torsional stress problems, this type of vehicle usually has a heavy, strong frame to absorb the torsional stress transmitted to the frame when the wheels traverse uneven ground. Nevertheless, the torsional stress is not eliminated.

The split frame, split body vehicle is constructed to provide a forward and rear body section imposed upon a hinged or articulated vehicle frame. There is a tendency in this type of vehicle for the front and rear bodies to jackknife when the brakes or power are applied to the wheels of one body section and not another. In addition, because of the split body, the cargo or passenger carrying capacity of the vehicle is smaller than a single body vehicle of similar dimensions.

SUMMARY

Our vehicle eliminates the foregoing problems by using a one piece body which is carried by a split frame. The frame includes a pair of forwardly and a pair of rearwardly extending frame arms which are rotatably secured to a central axle, and each of the frame arms are independently rotatable with respect to the central axle. The body remains relatively level even though one or more wheels are raised and is supported by the frame by means of front and rear connecting arms which extend between the forward and rearward frame arms. Each of the connecting arms are attached to a pair of frame arms, but the connecting arm is extendible to permit the distance between the frame arms to increase as when one frame arm rotates about the central axle. The connection between each of the connecting arms and the body includes a universal joint to prevent torsional stress from being transmitted to the body, and the universal joint and the body are maintained centered with respect to the frame by centering arms attached to the frame arms.

DESCRIPTION OF THE DRAWING

Our invention is explained in conjunction with an illustrative embodiment shown in the accompanying drawing, in which—

FIG. 1 is a perspective view of a six-wheeled vehicle embodying our invention;

FIG. 2A is a schematic view showing one of the middle wheels traversing an obstacle;

FIG. 2B is a view similar to FIG. 2A showing one of the rear wheels traversing the obstacle;

FIG. 2C is an end view of the vehicle showing one of the rear wheels traversing an obstacle;

FIG. 3 is an enlarged fragmentary sectional view of the vehicle shown in FIG. 2C;

FIG. 4 is an enlarged view of FIG. 2A;

FIG. 5 is a side view of the frame of the vehicle in the position illustrated in FIG. 4 taken along the line 5—5 of FIG. 7;

FIG. 6 is an enlarged fragmentary view of FIG. 3;

FIG. 7 is a top plan view of the vehicle with the body removed showing the frame;

FIG. 8 is an enlarged fragmentary view, partially in section, of the front connecting arm of FIG. 7;

FIG. 9 is a perspective view of a portion of FIG. 8;

FIG. 10 is an exploded perspective view of FIG. 9;

FIG. 11 is a fragmentary exploded perspective view of the differential connecting arm and the rear connecting arm;

FIG. 12 is a side view of the differential connecting plate and the rear connecting arm;

FIG. 13 is a perspective partially exploded view of the front connecting arm and the body attachment means;

FIG. 14 is a sectional elevational view of one-half of the central axle;

DESCRIPTION OF SPECIFIC EMBODIMENT

Referring to FIGS. 1–5, a six-wheeled vehicle designated generally by the numeral 20 includes a one piece or non-articulated body 21 carried by a frame 22. Three wheels 23a, 23b, and 23c are mounted on the left side of the frame, and three wheels 24a, 24b, and 24c are mounted on the right side of the frame. Referring to FIG. 2A, the middle wheel 23b on the left side is traversing a hump H while the remaining wheels of the vehicle remain level. In FIG. 2B, the middle wheel 23b has passed over the hump and the rear wheel 23c on the left side is raised independently of the other wheels as it passes over the hump. FIG. 2C illustrates the rear wheel 24c of the right side being raised as it passes over hump H.

Referring to FIGS. 7 and 14, the frame 22 includes a central axle 25 which includes an axle shaft 25a and a pair of tubular shaft housings 25b and 25c. The shaft 25a is attached to the right and left hand center wheels 23b and 24b in the conventional manner and is rotatably carried by the left and right hand tubular shaft housings 25b and 25c as will be explained more fully hereinafter. The shaft housings are secured to opposite sides of a differential housing 26 which contains a conventional automotive limited-slip differential.

A pair of frame arms 27 and 28 extend forwardly from the axle housings 25b and 25c, respectively, and a pair of frame arms 29 and 30 extend rearwardly therefrom. Each of the frame arms are generally channel-shaped in vertical cross section and are rotatably connected to their respective axle housings. Frame arm 27 is offset inwardly as at 27a, and attaching arm portions 27b and 27c extend rearwardly therefrom toward the axle housing 25b and terminate in attaching plates 27d and 27e, respectively, which are provided with openings which receive the axle housing. Similarly, frame arm 28 includes rearwardly extending arm portions 28b and 28c which are provided with attaching plates 28d and 28e provided with openings which receive the tubular housing 25c. The frame arms 29 and 30 are similarly constructed, the frame arm 29 including attaching plates 29d and 29e positioned inwardly of the attaching plates 27d and 27e, and the frame arm 30 including attaching plates 30d and 30e positioned on the tubular housing 25c inwardly of the attaching plates 28d and 28e. The frame arms are seen to be rotatable about the axle housing independently of each other, and suitable detents may be provided thereon if desired to limit the degree of rotation of the forwardly extending arms with respect to the rearwardly extending arms.

The free end of the frame arm 27 is provided with an opening which receives a stub shaft housing 31 which rotatably carries a stub shaft 32. The housing 31 is secured to the end of the frame arm 27 as by bolts.

Central axles shaft 25a carries sprockets 39 and 40 which are enclosed by radially enlarged sprocket housing 41 on the shaft housing 25b. The sprockets 39 and 40 may be operatively connected, respectively, to the stub shafts 32 and 44 associated with the wheels 23a and 23c by chain and sprocket connections. Similarly, shaft housing 25c includes a radially enlarged sprocket housing 45 enclosing sprockets 46 and 47 which are attached to the central axle and which may be connected to the stub shafts of the wheels 24a and 24c.

The differential includes a conventional drive shaft connection (not shown) which is adapted to be connected to a suitable power source, and the differential drives the central axle shaft 25a which in turn causes the front and rear wheels to rotate by virtue of the chain and sprocket connections. If desired, however, the vehicle may be provided with only four-wheel or two-wheel drive rather than six-wheel drive, and either or both of the front or rear sprocket assemblies may be eliminated.

A front connecting arm 55 extends transversely between the forwardly extending frame arms 27 and 28 at approximately ⅔ the distance between the central axle and the front stub axles, and a rear connecting arm 56 extends transversely between the rearwardly extending arms 29 and 30 at approximately ⅔ the distance between the central axle and the rear stub axles.

Referring to FIGS. 8 and 13, the front connecting arm 55 is composed of three automotive type spring leafs 57, 58, and 59 which are held together by bands 60. Each of the bands 60 are suitably secured to the top leaf 59 as by welding, and the bands 60 are sized to secure the spring leafs while permitting relative sliding movement therebetween. The bottom leaf 57 is provided with a bifurcated looped end 61, and the middle leaf is provided with a bifurcated looped end 62. A centering arm 63 is rotatably secured to the top spring leaf 59 by bolt or rivet 64, and when the vehicle rests on level terrain, the centering arm 63 is inclined somewhat from the longitudinal axis with respect to the connecting arm 55 as shown in FIG. 8.

Each of the frame arms 27 and 28 includes an inwardly extending eye bracket 65 and 66, respectively, which is received between the bifurcated halves of one end of one of the spring leafs. The bifurcated end 61 of the bottom spring leaf is attached to the eye bracket 65 by bolt 67 which is surrounded by a rubber sleeve 68. Similarly, the bifurcated end 62 is secured to the eye bracket 66 by bolt 69 which is surrounded by rubber sleeve 70.

Each of the bolts 67 and 69 are provided with a ball fitting 71 and 72, respectively, at one end thereof, and each of the ball fittings is received by a ball socket provided in one of the centering tie rods 73 and 74. The centering tie rod 73 includes a central rod portion 73a and a cylindrical fitting 73b threadedly secured on the outer end of the rod 73a which provides the ball joint opening for the ball fitting 71. The inner end of the rod portion 73a is bent downwardly as at 73c (FIG. 10) and is received by an opening 75 provided in one end of the centering arm 63. If desired, washers 76 may be received on the bolt 67 between the connecting arm 55 and the tie rod 73 and between the connecting arm and the nut 77 which threadedly engages the bolt. Similarly, the bolt 69 may receive washers 78 and nut 79.

Centering tie rod 74 similarly includes a rod portion 74a and a cylindrical end portion 74b, and the hooked end 74c of the rod portion is received in an opening 80 in the other end of the centering arm.

Referring to FIGS. 11 and 12, the rear connecting arm 56 is similar to the front connecting arm and includes bottom leaf spring 81, a middle leaf spring 82 and a top leaf spring 83, all of which are held together by bands 84 which are secured to the top leaf spring and which permit relative sliding movement of the leaf springs. An attaching plate 85 is secured to the top of the top leaf spring 83 and rear centering arm 86 is rotatably secured to the attaching plate 85 and top leaf spring 83.

The attaching plate 85 is offset downwardly at 86a and supports a disc 87 rotatably secured thereto by bolt 88. A housing 89 is secured to the disc 87 for rotation therewith and slidably receives rod 90 which is formed on the end of bar 91. The forward end of bar 91 is rotatably secured to differential connecting plate 92 which is secured to the differential housing 26 by circular clamps 93 and bolts 93a and extends rearwardly therefrom. The sides of plate 92 include reinforcing ribs 94, and a restraining bar 95 extends between the ribs 94 above the bar 91. The attaching plate ties the differential to the rear connecting arm 56 and prevents the differential from twisting.

Referring to FIG. 7, the rear connecting arm 56 is secured to eye brackets 96 and 97 which extend inwardly from the frame arms 29 and 30, respectively, in the manner described with respect to the front connecting arm 55. The bifurcated looped ends 98 and 99 (FIG. 6) of the middle and bottom leaf springs 82 and 81, respectively, are secured to the eye hooks 96 and 97 by bolts 100 and 101 similar to the bolts 67 and 69, which secure the front connecting arm. The ball fitting of the bolt 100 is received by the ball joint opening provided in the connecting tie rod 102, and the ball fitting of the bolt 101 is received by the ball joint opening of the connecting tie rod 103. Each of the tie rods 102 and 103 is provided with hooked ends which are received in openings on opposite ends of the centering arm 86.

The body 21 includes a tubular reinforcing bar 104 (FIGS. 3 and 7) which extends in a rectangular shape and is secured to the lower surface of the body. A pair of U-shaped yokes or body supports are secured to the reinforcing bar, and each yoke extends downwardly above one of the front and rear connecting arms 55 and 56. The rear yoke 105 is illustrated in FIG. 3, and a similar yoke is secured to the reinforcing bar above the front connecting arm. The bottom of the yoke 105 is provided with a ball joint cup which receives ball fitting 106 (FIGS. 11 and 12) which is secured to the rear centering arm 86 and provides a universal ball joint connection between the rear of the body and the rear of the frame.

The front of the body is connected to the front of the frame by means of a universal joint 107 and a channel slide 108 (FIG. 13). The universal joint is attached to the front centering arm 63 by attaching brackets 109 which are secured to the centering arm, and the channel slide 108 is welded to the top of the universal joint so that it may rotate about axes both longitudinal and transverse with respect to the frame and body. The channel slide 108 slidably receives plate 110 which is welded to the front yoke which extends downwardly from the reinforcing bar 104 on the body. Thus, while the front of the body is connected to the forwardly extending frame arms 27 and 28, the body may slide longitudinally with respect to these frame arms. The rear of the body, however, always remains fixed longitudinally with respect to the rear centering arm 86 by virtue of the ball joint coupling therebetween. If desired, the sliding universal coupling 107 and the ball joint coupling 106 may be reversed. That is, the sliding universal coupling may be attached to the rear connecting arm and the ball joint may be attached to the front connecting arm.

As can be seen best in FIGS. 3 and 7, an upwardly extending body post 111 is secured to each of the frame arms 27–30 at the inwardly offset portion, e.g., at 27a on frame arm 27. The upper end of each body post carries a bearing housing 112 which rotatably holds a ball bearing 113. The bearings 113 engage plates 114 which are secured to the reinforcing bar 104 and substantially prevent the body from rotating about its longitudinal axis while permitting vertical movement of the body with respect to the frame.

Any suitable engine for driving the central axle shaft 25a may be used, and the engine may be carried by the body. The driving shaft of the engine should be connected to the drive shaft connection of the differential 26 by universal joint linkage so that torsional stress is not transmitted from the frame to the body through the drive linkage.

OPERATION

When the vehicle is traversing level terrain, the frame arms 27–30 are all substantially parallel, and the body is supported in a horizontal position at both the front and the rear by the front and rear connecting arms 55 and 56. When any of the wheels encounter an obstacle or an incline, that wheel is allowed to independently rise to follow the contour of the obstacle without transmitting torsional stress to the remainder of the frame or to the body. For example, FIGS. 2C and 3 illustrate the vehicle with the rear right hand wheel 24c traveling over the hump H. When the rear wheel encounters the hump, the frame arm 30 rotates upwardly about the central axle 25. As the frame arm 30 rotates upwardly, the distance between the frame arm 30 and the frame arm 29 increases, and the spring leafs 81 and 82 slide with respect to each other to accommodate the increased distance between the frame arms. As can be seen in FIG. 6, the spring leafs 81 and 82 have moved from their original positions illustrated in phantom at 81' and 82' respectively, to the positions illustrated in solid. However, the ball fitting 106 carried by the rear centering arm 86 is always maintained centrally of the frame arms 29 and 30 as the rear connecting arm extends by the centering arms 102 and 103. Referring to FIG. 7, as the frame arm 30 moves upwardly and the connecting arm 56 extends, the centering arm 86 will be rotated clockwise by the centering rods, and the ball fitting 106 will be maintained in the center of the frame. The ball fitting 106 rotates within its associated cup fitting carried by the yoke 105 as the rear connecting arm 56 becomes inclined with respect to the horizontal (FIGS. 3 and 6), and no torsional stress is transmitted to the body.

While, the frame arm 30 rotates upwardly, the eye bracket 97 thereon tends to move forwardly with respect to the eye bracket 96 on the frame arm 29, and the rear connecting arm 56 twists slightly with respect to the frame arms. However, the twisting of the connecting arm is accommodated by the rubber sleeves carried by the connecting bolts 100 and 101, and stress is not transmitted from one frame arm to the other. Since the forwardly extending frame arms 27 and 28 are independently connected to the central axle 25, rotation of one of the rear frame arms about the central axle does not affect the front frame arms.

With the rear right hand wheel 24c in the position illustrated in FIG. 3, the rear of the body has been lifted somewhat from its original position by the raising of the rear connecting arm 56. However, rotation of the body about its longitudinal axis is substantially prevented by the body support posts 111, and the body is permitted to tilt from back to front by virtue of the universal joint connections between the front and rear of the body and the front and rear connecting arms. As the rear of the body is lifted, the channel slide 108 secured to the front centering arm 63 (FIG. 13) rotates about the axis of the universal joint which extends transversely of the body, and the plate 110 secured to the front body yoke slides somewhat forwardly within the channel slide to accommodate the decreased distance between the front and rear centering arms 63 and 86 as the rear of the body is raised. If both of the rear wheels 23c and 24c are raised, both of the frame arms 29 and 30 rotate about the central axle; the rear of the body moves both upwardly and forwardly; and the attaching plate 110 slides forwardly within the slide channel 108.

Similarly, if one of the front wheels 23a or 24a encounters an obstacle, the associated frame arm will rotate about the central axle 25, and the front connecting arm 55 will extend to accommodate the increased distance between the two front frame arms. However, even though the front connecting arm extends, the universal joint 107 is maintained centrally of the frame arms by the centering arm 63 and the centering tie rods 73 and 74. The front connecting arm is freely permitted to become inclined with respect to the horizontal without transmitting stress to the body by virtue of the universal joint 107 which secures the front connecting arm to the front of the body, and the body is permitted to slide along its longitudinal axis with respect to the front connecting arm to accommodate the change in distance between the front and rear centering arms as one or both of the front frame arms is raised.

If one of the central wheels is raised with respect to the other wheels, as illustrated in FIGS. 4 and 5, the central axle 25 will be raised and the forwardly and rearwardly extending frame arms will rotate downwardly relative to the central axle. The distance between the front and rear connecting arms will decrease, and the plate 110 will slide forwardly within the channel slide 108.

Thus, no matter whether one or more of the wheels are lifted with respect to the others, no torsional stress is created in the frame or transmitted to the body. The body is connected to the frame at only two points, and the centering arms maintain the frame and the body centered at all times. Only one point on the frame, the ball fitting 106, is maintained in a fixed longitudinal position with respect to the body, and the ball fitting may rotate freely with respect to the body to permit rotation of the rear connecting arm about the longitudinal and transverse axes. Even though the body is connected to the frame at only two points, the body is substantially prevented from rotating about its longitudinal axis by the four body support posts 111. Rotation of the body about its transverse axis is permitted by virtue of the universal joint 107 and channel slide 108.

Suitable detents may be provided on the frame arms if desired to limit the upward rotation of the frame arms so that they do not contact the body. For example, detents on the frame arms 27 and 29 may be engageable with each other to prevent excessive rotation of one of the arms with respect to the other, and detents on the frame arms 28 and 30 may be engageable with each other.

The differential housing is rotatable with respect to the central axle shaft to permit the differential to move up and down with respect to the engine carried by the housing without transmitting stress to the body, and the differential connecting plate 92 slidably secured to the rear connecting arm supports the differential without interfering with this movement. Referring to FIGS. 11 and 12, if one of the rear frame arms is lifted and the rear connecting arm 56 becomes inclined with respect to the central axle, the housing 89 rotates about the rod 90 and no stress is created. Side-to-side movement of the rear centering arm with respect to the differential is permitted by the swingable bar 91 and rotatable disc 87.

Referring to FIGS. 3 and 6, when either of the front or rear wheels is raised with respect to the other, the independently rotatable frame arms maintain each of the wheels in a generally vertical plane and permit the treads of each wheel to make full contact with the ground, and the body is maintained centered at the midpoint of the horizontal distance between the wheels. As a result each wheel of the associated right and left hand wheel pairs 23a and 24a, 23b and 24b, and 23c and 24c will support the same weight. For example, referring to FIG. 3, if the rear connecting arm 56 is inclined from the horizontal at an angle $\theta$, and the weight W of the body exerted on the connecting arm is exerted at a distance $x_1$ from the right wheel 24c along the rear connecting arm, $x$ being the total distance between the wheels 23c and 24c or the length of the rear connecting arm, and the wheel 23c provides a lifting force $F_1$ while the wheel 24c provides a lifting force $F_2$, then:

$$W = F_1 + F_2$$
$$F_1(x-x_1) \cos \theta = F_2 x_1 \cos \theta$$

These equations result in the following values for $F_1$ and $F_2$:

$$F_1 = \frac{x_1}{x} W$$

$$F_2 = \frac{x-x_1}{x} W$$

$F_1$ and $F_2$ will therefore be equal if $x_1$ equals $x/2$. Since the centering arms maintain the connection between the body and the connecting arm at exactly half the length of the rear connecting arms, $x_1$ does equal $x/2$, and each of the wheels will support the same weight even though the connecting arm is inclined with respect to the horizontal.

The front and rear connecting arms are attached to their respective frame arms at approximately ⅔ the distance from the central axle to the ends of the frame arms so that the weight supported by each of the three wheels on either side of the vehicle will be approximately equal even when one of the wheels is raised with respect to the others as in FIG. 4. For example, suppose that wheel 23a provides a lifting force $F_1$, wheel 23b provides a lifting force $F_2$, and wheel 23c provides a lifting force $F_3$. The weight of the body is supported by the frame at the front and rear connecting arms, and the front connecting arm supports a portion $W_1$ of the body weight W at a distance $y_1$ from the central axle, $y$ being the total length of the forward frame arm. Similarly, the rear connecting arm supports a portion $W_3$ of the body weight at a distance $y_3$ from the central axle, $y$ being the total length of the rear frame arm, which is the same length as the front frame arm. Since the frame arms are independent links, the weight distributions are given individually by:

$$F_1 = \frac{y_1}{y} W_1$$

$$F_3 = \frac{y_3}{y} W_3$$

$$F_{21} = \frac{y-y_1}{y} W_1$$

$$F_{23} = \frac{y-y_3}{y} W_3$$

where $F_{21}$ is the component of $F_2$ required to support the weight $W_1$ and $F_{23}$ is the component of $F_2$ required to support the weight $W_3$.

If the weight of the body is uniformly distributed so that the center of gravity of the body is above the central axle, $W_1 = W_3$. If the lifting force provided by the three wheels are to be equal, then $$F_1 = F_{21} + F_{23} = F_3$$

and $$y_1 = y_3 = 2y - y_1 - y_3$$

or $$y_1 = y_3 = \tfrac{2}{3} y$$

Thus, if the weight of the body is evenly distributed therealong and if the connecting arms are secured to the frame arms at ⅔ the distance between the central axle and the ends of the frame arms, each of the three wheels on each side of the vehicle will support the same weight. The position of the engine can be positioned on the body in order to provide the center of gravity of the vehicle at approximately above the central axle. The driver seat S should then be positioned approximately above the central axle so that when the vehicle is occupied the center of gravity does not appreciably shift. Alternatively, the position of the engine and the driver seat can be chosen so that the center of gravity of the vehicle will be located above the central axle when a driver of average weight is seated in the driver's seat.

Preferably the engine is located above the rear centering arm 56 so that maximum clearance is provided between the frame and the engine. The vertical distance between the body and the centering arm 86 of the rear connecting arm is fixed because the centering arm is connected to the rear yoke 105 of the body, and the chance that part of the frame will hit the engine is minimized. The only two points of the frame that are maintained a fixed distance from the body are the front and rear centering arms 63 and 86, respectively, which are connected to the rigid yokes 105.

DETAILED DESCRIPTION OF CENTRAL AXLE

FIG. 14 illustrates in detail the central axle 25 which was described generally hereinbefore. The central axle 25a is rotably supported by the central axle housing 25b, and the outer end is bolted to the wheel rim 115. The central axle housing 25b is formed in two parts 25b′ and 25b″, and each of the housing parts is threadedly received by the sprocket housing 45. The sprocket housing 45 carries bushings 116 which rotatably support the central axle 25a, and the outer end of the central axle 25a is supported by bearing and brace assemblies 117 carried by the outer portion 25b″ of the axle housing. Each of the sprockets 46 and 47 are secured to the central axle shaft for rotation therewith. The differential housing 26 is secured to the inner end of the central axle housing portion 25b′, and the attaching plates 28d and 30d of the frame arms 28 and 30, respectively, ride on the housing portion 25b′ between the differential and the sprocket housing. Similarly the attaching plate 28e and 30e of the frame arms ride on the housing portion 25b″ outwardly of the sprocket housing.

A wheel cover plate 118 is secured to the outer end of the central axle housing by bolts 119 and encloses brake shoes 120 which are engageable with brake drums 115a on the wheel rim.

While in the foregoing specification we have set forth a detailed description of a specific embodiment of our invention for the purpose of explanation, it is to be understood that the details herein given may be varied considerably by persons skilled in the art without departing from the spirit and scope of our invention.

We claim:

1. A six-wheeled vehicle comprising a frame having a forward end and a rearward end and a unitary body on said frame, said frame including
   a central axle having a wheel on each end thereof,
   a first pair of frame arms rotatably secured to said central axle and extending forwardly therefrom,
   a second pair of frame arms rotatably secured to said central axle and extending rearwardly therefrom, one of each of said first and second pair of arms being secured to said central axle adjacent one end of the central axle and the other of each of said first and second pair of arms being secured to said central axle adjacent the other end thereof,
   a front wheel mounted on the forward end of each of the forwardly extending frame arms,
   a rear wheel mounted on the rearward end of each of the rearwardly extending frame arms,
   first extendible arm means connecting each of said forwardly extending frame arms,
   second extendible arm means connecting each of said rearwardly extending frame arms,
   first universal joint means connecting said first extendible arm means to said body,
   and second joint means connecting said second extendible arm means to said body, the weight of said body being supported by said frame only at said first and second joint means,
   and post means on each side of said frame for restraining rotation of the body about the longitudinal axis thereof.

2. The structure of claim 1 in which said support means includes a body support post extending upwardly from each of said frame arms.

3. The structure of claim 1 in which said post means includes a body support post extending upwardly from each of said frame arms, each body support post being provided with roller means adjacent the upper end thereof, said roller means engageable with said body to restrain rotation of the body about the longitudinal axis thereof while permitting generally vertical sliding movement of the frame arms relative to the body.

4. The structure of claim 1 in which said first extendible arm means is connected to said forwardly extending frame arms intermediate the central axle and the front wheels and said second extendible arm means is connected to said rearwardly extending frame arms intermediate the central axle and the rear wheels.

5. The structure of claim 1 in which the said first extendible arm means is connected to said forwardly extending frame arms at approximately ⅔ the distance from the central axle to the front wheels and said second extendible arm means is connected to said rearwardly extending frame arms at approximately ⅔ the distance from the central axle to the rear wheels.

6. A six-wheeled vehicle comprising a frame having a forward end and a rearward end and a body on said frame, said frame including
   a central axle having a wheel on each end thereof,
   a first pair of frame arms rotatably secured to said central axle and extending forwardly therefrom,
   a second pair of frame arms rotatably secured to said central axle and extending rearwardly therefrom, one of each of said first and second pair of arms being secured to said central axle adjacent one end of the central axle and the other of each of said first and second pair of arms being secured to said central axle adjacent the other end thereof,
   a front wheel mounted on the forward end of each of the forwardly extending frame arms,
   a rear wheel mounted on the rearward end of each of the rearwardly extending frame arms,
   first extendible arm means connecting each of said forwardly extending frame arms,
   second extendible arm means connecting each of said rearwardly extending frame arms,
      each of said first and second extendible arm means including a pair of bars, each bar of each pair being connected to one of the frame arms and being joined to the other bar of the pair for relative sliding movement therebetween,
   first joint means connecting said first extendible arm means to said body,
   and second joint means connecting said second extendible arm means to said body.

7. A six-wheeled vehicle comprising a frame having a forward end and a rearward end and a body on said frame, said frame including
   a central axle having a wheel on each end thereof,
   a first pair of frame arms rotatably secured to said central axle and extending forwardly therefrom,
   a second pair of frame arms rotatably secured to said central axle and extending rearwardly therefrom, one of each of said first and second pair of arms being secured to said central axle adjacent one end of the central axle and the other of each of said first and second pair of arms being secured to said central axle adjacent the other end thereof,
   a front wheel mounted on the forward end of each of the forwardly extending frame arms,
   a rear wheel mounted on the rearward end of each of the rearwardly extending frame arms,
   first extendible arm means connecting each of said forwardly extending frame arms,
   second extendible arm means connecting each of said rearwardly extending frame arms,
      each of said first and second extendible arm means including a first bar attached to one of the associated frame arms, a second bar attached to the other of the associated frame arms, and a third bar, said bars being joined for relative sliding movement therebetween, centering rod means attached to each of the associated frame arms and to the third bar for maintaining the third bar generally centered between the frame arms as the first and second bars slide with respect to each other,
   first joint means connecting the third bar of the first arm means to the body, and second joint means connecting the third bar of the second arm means to the body.

8. The structure of claim 7 wherein each of said centering rod means includes an elongated centering arm and a pair of centering rods, the middle of the centering arm being rotatably secured to the associated third bar, each of the centering rods being secured to one of the associated frame arms and one end of the centering arm.

9. The structure of claim 7, in which each of said first and second joint means includes a universal joint secured to the third bar thereof.

10. The structure of claim 7 including a differential housing carried by said central axle and rotatable in a plane transverse to said axle, differential connecting means attached to said housing and to the third bar of one of said first and second extendible arm means, said differential connecting means permitting inclination of said one extendible arm means with respect to said central axle.

11. The structure of claim 7 in which one of said joint means includes a ball-and-socket connection between the body and the third bar of the associated arm means and the other joint means includes a universal joint and slide means, said slide means permitting front-to-rear movement of the extendible arm means associated with said other joint means with respect to said body.

12. A six-wheeled vehicle comprising a frame having a forward end and a rearward end and a body on said frame, said frame including a central axle having a wheel on each end thereof,
a first pair of frame arms rotatably secured to said central axle and extending forwardly therefrom,
a second pair of frame arms rotatably secured to said central axle and extending rearwardly therefrom, one of each of said first and second pair of arms being secured to said central axle adjacent one end of the central axle and the other of each of said first and second pair of arms being secured to said central axle adjacent the other end thereof,
a front wheel mounted on the forward end of each of the forwardly extending frame arms,
a rear wheel mounted on the rearward end of each of the rearwardly extending frame arms,
first extendible arm means connecting each of said forwardly extending frame arms,
second extendible arm means connecting each of said rearwardly extending frame arms,
first joint means connecting said first extendible arm means to said body,
second joint means connecting said second extendible arm means to said body,
first centering means on said frame for maintaining said first joint means approximately midway between the forwardly extending frame arms,
and second centering means on said frame for maintaining said second joint means approximately midway between the rearwardly extending frame arms.

References Cited

UNITED STATES PATENTS

| 2,642,144 | 7/1953 | Brewer | 180—22 |
| 3,161,172 | 12/1964 | Kassbohrer | 180—24 X |
| 3,351,037 | 11/1967 | Meili | 180—23 X |

A. HARRY LEVY, Primary Examiner

U.S. Cl. X.R.

180—41; 280—111